United States Patent [19]

Wilson et al.

[11] 4,106,833
[45] Aug. 15, 1978

[54] QUICK DISCONNECT INTERCELL BUSBAR FOR DEEP SUBMERGENCE BATTERIES

[75] Inventors: Jeffrey V. Wilson; Leroy W. Tucker; William D. Briggs, all of Camarillo; Alan T. Inouye, Ventura, all of Calif.

[73] Assignee: The United States of America as represented by the Secretary of the Navy, Washington, D.C.

[21] Appl. No.: 830,241

[22] Filed: Sep. 2, 1977

[51] Int. Cl.² ............... H01R 11/00; H01R 11/18; H01R 11/26
[52] U.S. Cl. ............... 339/29 B; 324/29.5; 339/94 R; 339/116 C; 339/232
[58] Field of Search ........... 339/19, 28, 29, 89, 339/94, 116, 150 B, 151 B, 224, 232, 252 P; 324/29.5; 174/72 R

[56] References Cited

U.S. PATENT DOCUMENTS

| | | | |
|---|---|---|---|
| 1,627,442 | 5/1927 | Luthy | 339/29 B |
| 2,557,615 | 6/1951 | Schneider | 339/116 R |
| 3,206,707 | 9/1965 | LoVetere | 339/28 |
| 3,349,322 | 10/1967 | Lowe | 324/29.5 |
| 3,643,208 | 2/1972 | Massa, Jr. | 339/94 R |

FOREIGN PATENT DOCUMENTS

| | | | |
|---|---|---|---|
| 279,921 | 11/1927 | United Kingdom | 339/252 P |
| 851,420 | 10/1960 | United Kingdom | 174/72 R |

Primary Examiner—Neil Abrams
Attorney, Agent, or Firm—Richard S. Sciascia; Joseph M. St.Amand; Darrell E. Hollis

[57] ABSTRACT

A quick disconnect intercell busbar for providing an easily removable, individually insulated bussing system for deep submergence batteries. A bussing conductor having silver plated copper pin terminations carries battery currents with a minimal voltage drop. The busbar is insulated to provide sealing of the battery electrical circuits thereby eliminating shorts caused by electrolyte contamination or seawater intrusion. A low current conductor connected to the bussing conductor with suitable insulation provides for monitoring of cell voltages.

4 Claims, 3 Drawing Figures

QUICK DISCONNECT INTERCELL BUSBAR FOR DEEP SUBMERGENCE BATTERIES

BACKGROUND OF THE INVENTION

1. Field of the Invention

This invention relates generally to battery busbars and more particularly to battery busbars for use on underwater deep submergence batteries.

2. Description of the Prior Art

The conventional method of rendering deep submergence batteries impermeable to shorting agents is to semi-permanently encapsulate the bussing system within polyurethane. This encapsulated system exhibits several serious disadvantages. The tops of pressure compensated deep submergence batteries utilized to power submersibles have been exposed to battery electrolyte spilled or carried from the cells by vented gas. This carryover phenomena is encouraged by the rapid decompression experienced during the submersibles ascent. This electrolyte establishes electrically conductive paths to the battery's bussing system. Through these paths cell to cell shorts are established and resistance between the battery and seawater ground is often reduced below the minimal acceptable limit for continuing a mission. Even with extensive maintenance these grounds are only temporarily eliminated.

In addition, the polyurethane potted bussing also precluded or made extremely difficult maintenance procedures. It is highly desirable to jumper a single cell or several cells out of a battery circuit during maintenance when the cells state of charge is significantly out of balance with the rest of the battery. With the potted bussing system this procedure requires chipping of large sections of polyurethane and then jumpering the cell. After the charging, the potting must be repoured and allowed to cure. Similarly, when a cell was determined to be in need of replacement it required removing the polyurethane potting, replacing the cell and then repouring the potting and allowing it to cure. In either case, chipping the potting is a time consuming as well as a dangerous task. Repouring the potting and allowing time to cure is a time consuming task. In addition, most of the polyurethane compounds utilized have been identified as cancer suspect agents and therefore must be carefully handled in an approved manner. In shott, the utilization of polyurethane insulation makes maintenance and repair extremely difficult and time consuming and does not provide adequate insulation in the presence of battery electrolytes.

SUMMARY OF THE INVENTION

The present invention overcomes the disadvantages and limitations of the prior art by providing an improved intercell busbar. The present invention utilizes a bussing conductor having silver-plated copper pin terminations for carrying battery current with a minimal voltage drop. An elastomeric insulating molded material insulates the conductor. A flange seal held in abutting relationship to a battery terminal post by a plastic lock nut seals the connection between the elastomeric insulation and the battery cell top after connection of the intercell busbar to the battery.

Accordingly, one object of the present invention is to provide an improved quick-disconnect, intercell busbar for use on deep submergence batteries.

Another object of the present invention is to provide a completely self-contained underwater battery busbar system.

A still further object of the present invention is to provide an intercell busbar which is reliable in operation and inexpensive to manufacture.

Another object of the present invention is to provide an intercell busbar for use on deep submergence batteries which eliminates shorts caused by electrolyte contamination or seawater intrusion.

Other objects and further scope of applicability of the present invention will become apparent from the detailed description given here and after. A detailed description indicates the preferred embodiments of the invention and is given by way of illustration only since various changes and modifications within the spirit and scope of the invention will become apparent to those skilled in the art from this detailed description when considered in connection with the accompanying drawings in which like reference numerals designate like parts throughout the figures thereof and wherein.

It should be understood that the foregoing abstract of the disclosure is for the purpose of providing a non-legal brief statement to serve as a search scanning tool for scientists, engineers and researchers and is not intended to limit the scope of the invention as disclosed herein nor is it intended that it should be used interpreting or in any way limiting the scope or fair meaning of the appended claims.

DETAILED DESCRIPTION OF THE PREFERRED EMBODIMENTS

Figure 1:
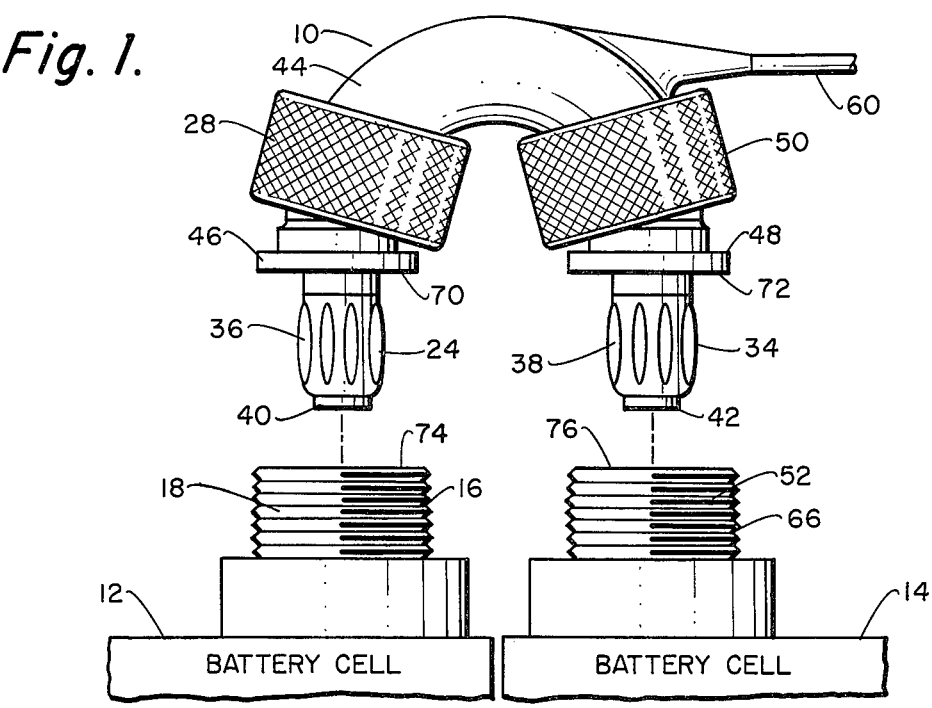
FIG. 1 is a side view illustrating a preferred embodiment of the invention.
Figure 2:
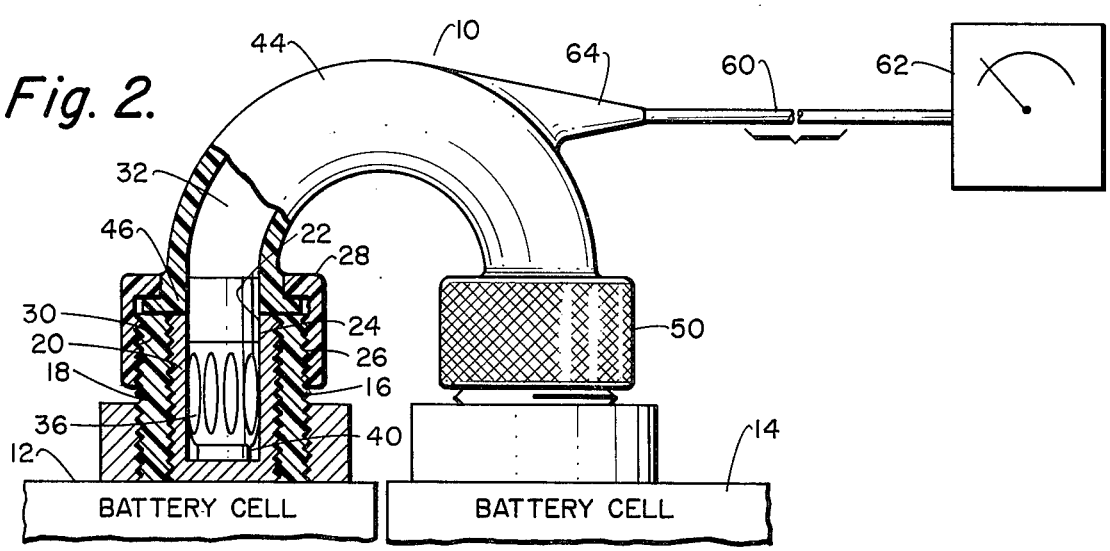
FIG. 2 illustrates in a partial section view the embodiment of FIG. 1 connected to a pair of battery terminal posts.

FIG. 1 is an illustration of the overall system operation of the preferred embodiment. The quick-disconnect intercell busbar generally designated by the numeral 10 electrically interconnects battery cells 12 and 14. As shown in FIG. 2 battery cell 12 includes a terminal post 16 having an intercore 20 fabricated of electrically conductive materials surrounded by an electrically insulating layer 18. Core 20 contains an opening 22 therein adapted to receive termination 24 of busbar 10 in a butting relationship thereto. The outside surface 26 of electrically insulating layer 18 is threaded to accept lock nut 28 which is threaded on the inside surface 30 thereof.

Intercell busbar 10 carries the current flowing between battery cells 12 and 14 through a flexible conductor 32. The flexible conductor 32 is fabricated from an electrically conductive material such as copper, aluminum, etc. Conductor 32 is terminated at either end into silver-plated copper pins 24 and 34. A soft silver solder is used to make the connection between the pins 24 and 34 and the conductor 32 in order to reduce the resistance through the busbar 10. Pins 24 and 34 are designed to accept contact bands 36 and 38 which are respectively held in place by caps 40 and 42. The caps 40 and 42 may be secured in place by screws not shown if desired. The termination pins 24 and 34 with contact bands 36 and 38 attached thereto are adapted to plug or fit into female battery cell terminal post such that contact bands 36 or 38 abut intercore 20 within opening 22 thereby providing an electrical connection therebetween.

Electrical and waterproof insulation of conductor 32 is provided by elastomeric insulating material 44 molded around conductor 32. A flange seal 46 is molded integral to elastomeric insulating material 44 adjacent termination pins 24 and 34. Lock nuts 28 and 50 are disposed to abut the top surface of flange seals 46 and 48 and screw down onto the threaded portions of threaded plastic cell top extension 18 and 52. As shown in FIG. 2 lock cap or lock nut 28 is screwed down over the threaded portion of cell top extension 18 such that flange seal 46 is disposed in abutting relationship between lock nut 28 and cell top extension thereby effecting a watertight seal between female terminal post 16 and molded insulating material 44.

Monitoring of cell voltage is accomplished through a small conductor 60 which electrically connects conductor 32 to volt meter 62. Molded elastomeric insulating material section 64 provides the necessary strain relief for conductor 60. Conductor 60 is also electrically insulated.

Intercell busbar 10 is installed by pushing pin terminations 24 and 34 into female terminal posts 16 and 66 extending respectively outward from the two battery cells 12 and 14 to be connected in series or in parallel. The electrical connection between the battery cells 12 and 14 is thus established through the contact bands 36 and 38, the termination pins 24 and 34 and the conductor 32. The height of cell top extensions 18 and 52 are such that when the busbar 10 is mated with the female terminal posts 16 and 66 flange seals 46 and 48 abut the cell top extensions 18 and 52. Lock nuts 28 and 50 are then screwed down onto the threaded portion of cell top extensions 18 and 52 until flange seals 46 and 48 establish a seal between the bottom surfaces 70 and 72 and the top surfaces 74 and 76 of cell top extensions 18 and 52. When both lock nuts 28 and 50 are torqued down in this manner electrical isolation from the surrounding environment is complete and intercell busbar 10 is installed and ready for operation.

Figure 3:
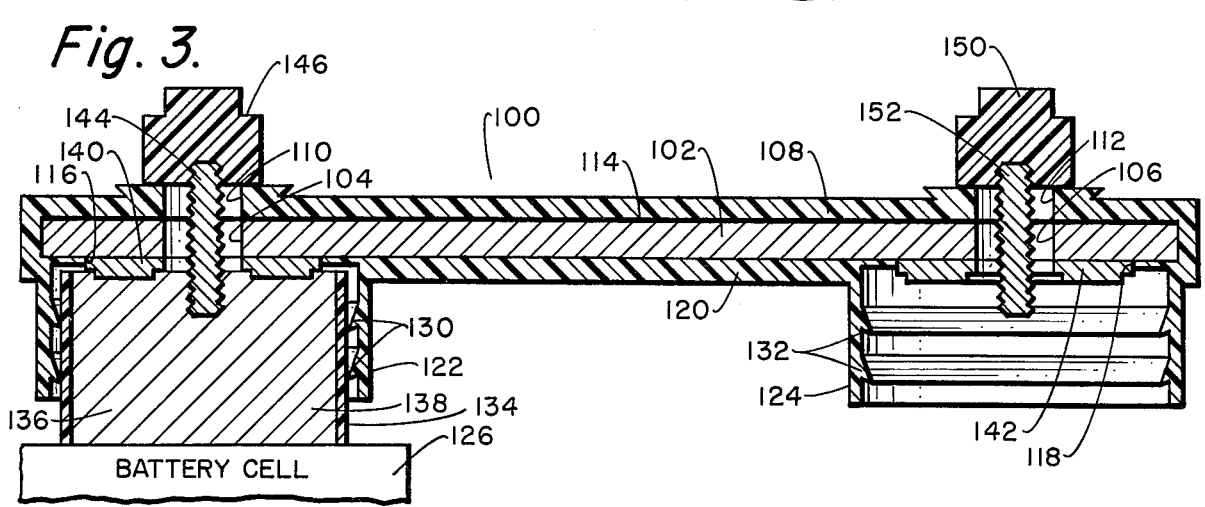
FIG. 3 is a cross-sectional view of an alternative embodiment of the present invention.

Now turning to FIG. 3, an alternate embodiment of the present invention is illustrated in cross section generally designated by the numeral 100. Busbar 100 consists of a elongated copper conductor 102 having openings 104 and 106 therethrough at opposite ends thereof. Molded elastomeric insulating material 108 surrounds conductor 102. Insulating material 108 contains openings 110 and 112 adjacent the top surface 114 of conductor 108 and openings 116 and 118 adjacent the bottom surface 120 of conductor 102. Openings 112, 106, 118 form a single path through busbar 100 while openings 110, 104 and 116 also provide a single path through busbar 100. Lips 122 and 124 are molded integral to insulating material 108 adjacent openings 116 and 118, respectively. Lips 122 and 124 include projections 130 and 132, respectively; configured to abut the outside surface of cell top extension 134 of terminal post 136 thereby providing a watertight seal therebetween. Plastic cell top extension 134 provides electrical insulation to conductor portion 138 of battery terminal post 136.

Silver plated contact disc 140 is disposed in abutting relationship to conductor 102 within opening 116. In its operational state, contact disc 140 is sandwiched in abutting relationship between conductor portion 138 of terminal post 136 and conductor 102 thereby providing an electrical path from battery cell 126 through multilam disc 140 through conductor 102 through contact disc 142 to the next battery terminal post.

Once intercell busbar 100 is emplaced with lip 122 in abutting relationship with terminal post 136, cover lid 146 is emplaced over opening 110. Cover lid 146 contains a downwardly extending threaded member 144 adapted to screw into terminal post 136. When tightened, cover lid 146 effects a pressure contact between conductor 102 multilam disc 140 and terminal post 136 and contact disc 140 thereby creating and maintaining an excellent electrical interconnection. In addition, cover lid 146 forms a waterproof seal between cover lid 146 and insulating material 108, thereby effecting complete isolation from the surrounding environment of the electrical path through busbar 100 from battery cell 126 to another battery cell (not shown). Likewise opening 112 of molded insulation 108 is covered with cover lid 150 having a downwardly extending threading member 152 for threaded engagement with a terminal post (not shown).

The molded elastomeric insulating material 44 and 108, lips 122 and 124, cover lid 146 and 150 as well as strain relief 64, may be fabricated from polychloroprene and chlorosulphonated polyethelene for successful operation. However, many other elastomers are equally well suited depending upon the ambient operating temperature and medium. The lock nuts 28 and 50 as well as cell top extensions 18 and 52 may be fabricated from polysulfone or polyvinylchloride materials among others. Again, other plastics are also suitable depending upon the operating temperature and surrounding environment.

Therefore, many modifications and embodiments of the specific invention will readily come to mind to one skilled in the art having the benefit of the teachings presented in the foregoing description and the accompanying drawings of the subject invention and hence it is to be understood that the invention is not limited thereto and that such modifications, etc., are intended to be included within the scope of the appended claims.

What is claimed is:

1. A quick disconnect intercell busbar for use on deep water submergence battery cells having insulated terminal posts comprising:
   a. a conductor having first and second terminations;
   b. a first male member connected to said first termination, said first member being configured to electrically mate with a female terminal post;
   c. a second male member connected to said second termination, said second member being configured to electrically mate with a female terminal post;
   d. waterproof insulating means for electrically insulating said conductor;
   e. a first flange seal molded integral with said waterproof means for establishing a waterproof connection between a terminal post and said waterproof insulating means upon the mating of said first member with a terminal post, said first flange seal being disposed adjacent said first member;
   f. a second flange seal molded integral with said waterproof means for establishing a waterproof connection between a terminal post and said waterproof insulating means upon the mating of said second member with a terminal post, said second flange seal being disposed adjacent said first member;

g. a first lock nut disposed adjacent said first flange seal such that, upon mating, said first lock nut may be screwed down around threaded portion of said female terminal post thereby effecting a waterproof seal between said waterproof insulating means and said female terminal post;

h. a second lock nut disposed adjacent said second flange seal such that, upon mating, said second lock nut may be screwed down around threaded portions of said female terminal post thereby effecting a waterproof seal between said waterproof insulating means and said female terminal post;

i. an insulated wire connected to said conductor for monitoring intercell voltage; and j. means for providing strain relief between said insulated wire and said conductor.

2. The apparatus of claim 1 wherein said strain relief means includes a thickened tapered piece of molded insulation connected between the insulation on said wire and said insulation on the conductor.

3. The apparatus of claim 1 further including first and second contact bands respectively disposed adjacent said first and second male members.

4. The apparatus of claim 1 wherein said conductor is fabricated from a flexible material.

* * * * *